United States Patent
Schnurr

(10) Patent No.: US 7,299,406 B2
(45) Date of Patent: Nov. 20, 2007

(54) REPRESENTING SPREADSHEET DOCUMENT CONTENT

(75) Inventor: Jeffrey R. Schnurr, Waterloo (CA)

(73) Assignee: Research in Motion Limited, Waterloo, Ontario (CA)

(*) Notice: Subject to any disclaimer, the term of this patent is extended or adjusted under 35 U.S.C. 154(b) by 406 days.

(21) Appl. No.: 10/857,900

(22) Filed: Jun. 2, 2004

(65) Prior Publication Data

US 2005/0273695 A1     Dec. 8, 2005

(51) Int. Cl.
*G06F 17/00*     (2006.01)
(52) U.S. Cl. .................. 715/503; 715/504; 715/513; 715/856; 715/863
(58) Field of Classification Search ............. 715/503, 715/854–856, 513, 500.1, 504, 509, 863; 709/206; 345/440; 382/298
See application file for complete search history.

(56) References Cited

U.S. PATENT DOCUMENTS

| | | | | |
|---|---|---|---|---|
| 4,945,475 A | * | 7/1990 | Bruffey et al. ................. 707/1 |
| 5,533,183 A | * | 7/1996 | Henderson et al. ........ 715/854 |
| 5,680,557 A | * | 10/1997 | Karamchetty .............. 715/866 |
| 5,880,742 A | * | 3/1999 | Rao et al. ................... 345/440 |
| 5,987,481 A | * | 11/1999 | Michelman et al. ....... 715/503 |
| 6,006,240 A | * | 12/1999 | Handley ...................... 715/510 |
| 6,085,202 A | * | 7/2000 | Rao et al. ................... 715/509 |
| 6,088,708 A | * | 7/2000 | Burch et al. ............... 715/509 |
| 6,115,759 A | * | 9/2000 | Sugimura et al. ............ 710/52 |
| 6,166,734 A | * | 12/2000 | Nahi et al. ................. 715/748 |
| 6,185,582 B1 | * | 2/2001 | Zellweger et al. ......... 715/503 |
| 6,243,093 B1 | * | 6/2001 | Czerwinski et al. ....... 715/848 |
| 6,476,831 B1 | * | 11/2002 | Wirth et al. ............... 715/784 |
| 6,523,040 B1 | * | 2/2003 | Lo et al. .................... 707/101 |
| 6,598,076 B1 | * | 7/2003 | Chang et al. .............. 709/206 |
| 6,625,812 B2 | * | 9/2003 | Abrams et al. ............. 725/105 |
| 6,674,453 B1 | * | 1/2004 | Schilit et al. .............. 715/810 |
| 6,675,351 B1 | * | 1/2004 | Leduc ......................... 715/503 |
| 6,704,024 B2 | * | 3/2004 | Robotham et al. ......... 345/581 |
| 6,865,720 B1 | * | 3/2005 | Otani et al. ................ 715/503 |

(Continued)

FOREIGN PATENT DOCUMENTS

WO     WO 02/44953 A2     6/2002

OTHER PUBLICATIONS

Research in Motion Limited, Attachment Service, www.blackberry.com, 2003, 9 pages, http://www.blackberry.com/knowledgeoontorpublic/livolink.exe/fetch/ . . . , Canada.

(Continued)

*Primary Examiner*—Doug Hutton
*Assistant Examiner*—James H. Blackwell

(57) ABSTRACT

A representation of a spreadsheet is displayed on a mobile communication device after receiving a description of a spreadsheet. The description relates to a plurality of map cells, where each map cell corresponds to a cell block, and the description includes location information and primary data type information for each map cell. Based on the location and content-type information in the description, a pictorial representation of the spreadsheet may be generated and displayed to a user of the mobile communication device. A mobile device server may not only generate the description, but also may interpret the user's selection of a region of interest and transmit enough information about the region of interest for the mobile communication device to present the region of interest to the user in a conventional viewer.

22 Claims, 7 Drawing Sheets

U.S. PATENT DOCUMENTS

| | | | |
|---|---|---|---|
| 6,874,131 B2 * | 3/2005 | Blumberg | 715/513 |
| 6,882,755 B2 * | 4/2005 | Silverstein et al. | 382/282 |
| 6,924,822 B2 * | 8/2005 | Card et al. | 345/660 |
| 6,941,354 B2 * | 9/2005 | Odamura | 709/219 |
| 6,976,226 B1 * | 12/2005 | Strong et al. | 715/788 |
| 2002/0016818 A1 | 2/2002 | Kirani et al. | |
| 2002/0030699 A1 * | 3/2002 | Van Ee | 345/810 |
| 2002/0032722 A1 * | 3/2002 | Baynes et al. | 709/202 |
| 2002/0047870 A1 * | 4/2002 | Carro | 345/855 |
| 2002/0052893 A1 * | 5/2002 | Grobler et al. | 707/509 |
| 2002/0065842 A1 * | 5/2002 | Takagi et al. | 707/500 |
| 2002/0087593 A1 * | 7/2002 | Rank | 707/503 |
| 2002/0101447 A1 * | 8/2002 | Carro | 345/760 |
| 2002/0169799 A1 * | 11/2002 | Voshell | 707/503 |
| 2002/0174141 A1 | 11/2002 | Chen | |
| 2003/0018668 A1 * | 1/2003 | Britton et al. | 707/513 |
| 2003/0023640 A1 * | 1/2003 | Challenger et al. | 707/530 |
| 2003/0033329 A1 * | 2/2003 | Bergman et al. | 707/503 |
| 2003/0093565 A1 * | 5/2003 | Berger et al. | 709/246 |
| 2003/0097384 A1 * | 5/2003 | Hu et al. | 707/514 |
| 2003/0226105 A1 * | 12/2003 | Waldau | 715/503 |
| 2004/0049737 A1 * | 3/2004 | Simon Hunt et al. | 715/513 |
| 2004/0174398 A1 * | 9/2004 | Luke et al. | 345/856 |
| 2004/0177323 A1 * | 9/2004 | Kaasila et al. | 715/513 |
| 2004/0205524 A1 * | 10/2004 | Richter et al. | 715/503 |
| 2004/0250220 A1 * | 12/2004 | Kalenius | 715/864 |
| 2005/0050044 A1 * | 3/2005 | Takagi et al. | 707/6 |
| 2006/0047855 A1 * | 3/2006 | Gurevich et al. | 709/247 |
| 2006/0103665 A1 * | 5/2006 | Opala et al. | 345/619 |
| 2006/0168506 A1 * | 7/2006 | Endo et al. | 715/500.1 |

OTHER PUBLICATIONS

Mittermeir R. et al., Finding High-Level Structures in Spreadsheet Programs, Ninth Working Conference on Reverse Engineering, Oct. 29-Nov. 1, 2002 Richmond USA.

Ballinger D. et al., Spreadsheet Visualisation to Improve End-User Understanding, Proceedings of the Australian Symposium on Information Visualisation, vol. 24, Feb. 2004, pp. 99-109, Adelaide, Australia.

* cited by examiner

REPRESENTING SPREADSHEET DOCUMENT CONTENT

FIELD OF THE INVENTION

The present invention relates to displaying documents on mobile communication devices and, more particularly, to representing spreadsheet document content on such devices.

BACKGROUND

Current wireless handheld mobile communication devices enable mobile professionals to stay current with information and communications, such as e-mail, corporate data and organizer information while they are away from their desks. A wireless connection to a server allows a mobile communication device to receive updates to previously received information and communications.

Many mobile professionals also require access to e-mail attachments when they are away from their computers. According to Delphi Forums, 80 percent of all corporate knowledge is stored in documents, so access to e-mail attachments is important.

Several solutions have been implemented to view attachments of various types on a mobile communication device. In one such implementation, a user may select to an attachment, say, by clicking on the attachment using a user interface input device (e.g., a thumbwheel) while viewing the e-mail message with which the attachment is associated. The user is then presented with a menu of options including an option to receive a "table of contents" and an option to receive the "full content". Upon receiving an indication that the user has opted to receive the full content, the server transmits a scaled-down representation of the content of the document to the mobile communication device, where the representation is displayed by a viewer application. However, in such a representation, only an initial portion of the full content is displayed in the viewer application and, as the user navigates around the document, individual requests for further portions of the full content are transmitted to the server. The server transmits the further portions of the full content to the mobile communication device responsive to the receipt of each request.

Viewing a spreadsheet (or other large document) on the small screen common to many mobile communication devices can be difficult when using this attachment viewing implementation, as it is often necessary to navigate past a large percentage of the document in order to find the content that is of particular relevance. Users are typically not interested in viewing an entire document on the mobile communication device, preferring a large screen at a desktop computer for such viewing, but, rather, are concerned with quickly zooming in on an area of interest.

Spreadsheets can contain many rows and columns. Getting a sense for the scope and layout of the document using a small viewing device may be considered difficult and navigating to a region of interest can be slow and network-traffic intensive.

SUMMARY

When an e-mail attachment of interest is a spreadsheet, a user of a mobile communication device is presented with an option to receive information summarizing the spreadsheet, from which a pictorial representation may be generated and displayed at the mobile communication device. Advantageously, such a pictorial representation presents the user with a high level perspective on the manner in which the data is laid out and provides a navigation interface that may be used to select a region of the document to be viewed. Responsive to the receipt of an indication of the selection of a region of interest, the server transmits the content applicable to that region to the mobile communication device. At the mobile communication device, the typical viewer application is then invoked to view the region of interest. Further advantageously, since the user is not required to scroll through several screens of the spreadsheet to get to the region of interest, which has associated sending of several requests and correspond receipt of data, network traffic required to view the region of interest is reduced.

In accordance with an aspect of the present invention there is provided a method of displaying a representation of a spreadsheet on a mobile communication device. The method includes receiving a description of a spreadsheet, where the description relates to a plurality of map cells, where each map cell in the plurality of map cells corresponds to a cell block including at least two adjacent cells of the spreadsheet and the description includes location information and primary data type information for each map cell, generating a pictorial representation of the spreadsheet, based on the location information and the primary data type information in the description and displaying the pictorial representation of the spreadsheet. In other aspects of the invention, a mobile communication device is provided, which is adapted to perform this method, and a computer readable medium is provided to adapt a mobile communication device to perform this method.

In accordance with an aspect of the present invention there is provided a method of preparing a description of a spreadsheet. The method includes analyzing each cell of a plurality of cells of a sheet of a spreadsheet: to determine whether each cell contains data; and, if the cell contains data, to determine a type for the data. The method also includes determining, from cell references of cells determined to contain data, sheet dimensions, where the sheet dimensions include a sheet length, expressed as a number of cells, and a sheet width, expressed as a number of cells and determining, from, at least in part, the sheet dimensions, cell block dimensions, where the cell block dimensions include a cell block length, expressed as a number of cells, and a cell block width, expressed as a number of cells. The method further includes considering the sheet divided into a plurality of cell blocks, each cell block of the plurality of cell blocks having the cell block dimensions and assigning a corresponding map cell to each cell block and assigning a corresponding map cell to said each cell block, thereby creating a plurality of corresponding map cells. The method further includes determining primary data type information and location information for each corresponding map cell of the plurality of corresponding map cells, where the primary data type information for each corresponding map cell is representative of a prevalent type of cell contents among cells in each cell block, and transmitting, to a mobile communication device, a description of the sheet including the primary data type information and the location information for each map cell. In other aspects of the invention, a mobile device server is provided, which is adapted to perform this method, and a computer readable medium is provided to adapt a mobile device server to perform this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
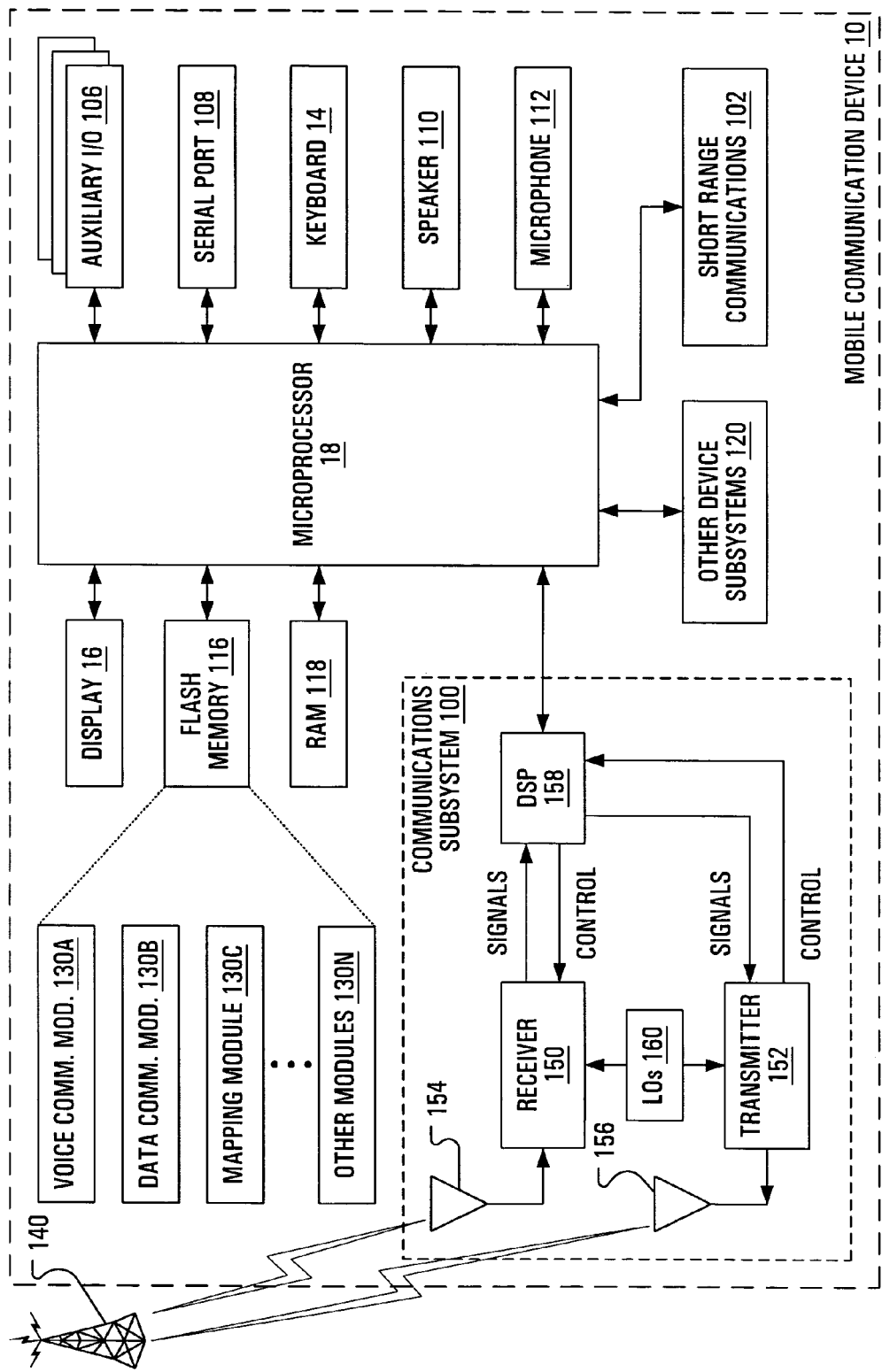
FIG. 1 illustrates a handheld mobile communication device suitable for employing embodiments of the present invention.

FIG. 1 illustrates a handheld mobile communication device 10 including a housing, an input device (a keyboard 14), and an output device (a display 16), which is preferably a full graphic Liquid Crystal Display (LCD). Other types of output devices may alternatively be utilized. A processing device (a microprocessor 18) is shown schematically in FIG. 1 as coupled between the keyboard 14 and the display 16. The microprocessor 18 controls the operation of the display 16, as well as the overall operation of the mobile device 10, in response to actuation of keys on the keyboard 14 by a user.

The housing may be elongated vertically, or may take on other sizes and shapes (including clamshell housing structures). The keyboard may include a mode selection key, or other hardware or software for switching between text entry and telephony entry.

In addition to the microprocessor 18, other parts of the mobile device 10 are shown schematically in FIG. 1. These include: a communications subsystem 100; a short-range communications subsystem 102; the keyboard 14 and the display 16, along with other input/output devices including a set of auxiliary I/O devices 106, a serial port 108, a speaker 110 and a microphone 112; as well as memory devices including a flash memory 116 and a Random Access Memory (RAM) 118; and various other device subsystems 120. The mobile device 10 is preferably a two-way radio frequency (RF) communication device having voice and data communication capabilities. In addition, the mobile device 10 preferably has the capability to communicate with other computer systems via the Internet.

Operating system software executed by the microprocessor 18 is preferably stored in a computer readable medium, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 18, in addition to its operating system functions, enables execution of software applications on the mobile device 10. A predetermined set of software applications that control basic device operations, such as a voice communications module 130A and a data communications module 130B, may be installed on the mobile device 10 during manufacture. A cell mapping module 130C may also be installed on the mobile device 10 during manufacture, to implement aspects of the present invention. As well, additional software modules, illustrated as an other software module 130N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless network 140. Preferably, the data items managed by the PIM application are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem 102. The communication subsystem 100 includes a receiver 150, a transmitter 152 and one or more antennas, illustrated as a receive antenna 154 and a transmit antenna 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, the communication subsystem 100 of the mobile device 10 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 10.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 10 may send and receive communication signals over the communication network 140. Signals received from the communication network 140 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g., modulated and encoded) by the DSP 158 and are then provided to the transmitter 152 for digital to analog conversion, frequency up conversion, filtering, amplification and transmission to the communication network 140 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 100 and is input to the microprocessor 18. The received signal is then further processed by the microprocessor 18 for an output to the display 16, or alternatively to some other auxiliary I/O devices 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example, to display the identity of a calling party, the duration of a voice call, or other voice call related information.

The short-range communications subsystem 102 enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 2:
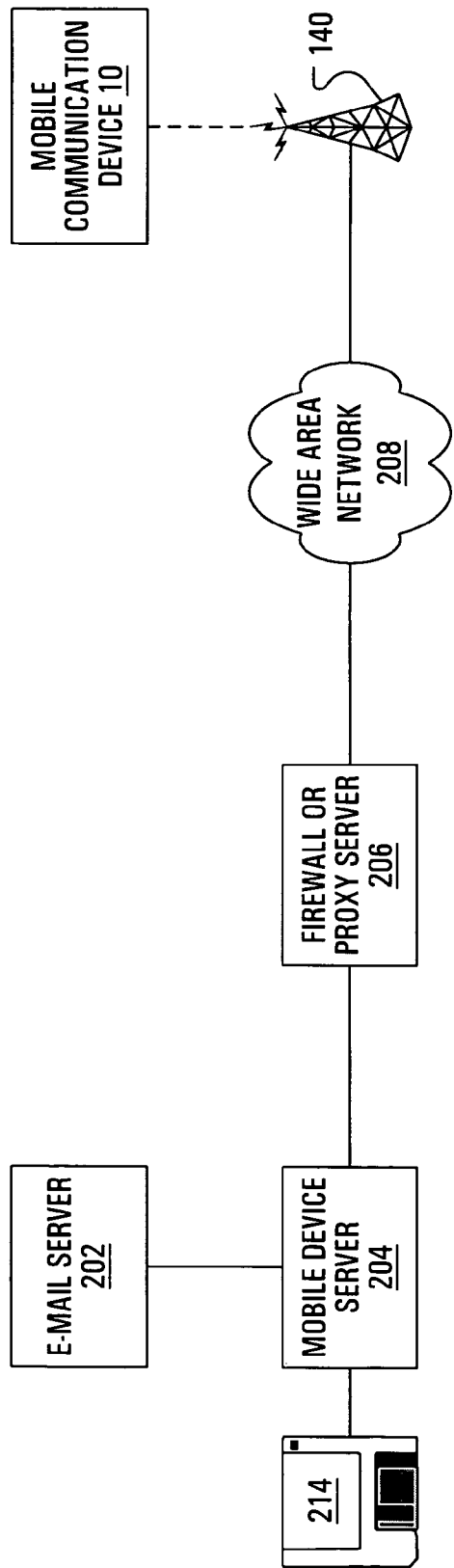
FIG. 2 illustrates a elements in an exemplary path from an e-mail server, through a mobile device server, to the mobile communication device of FIG. 1.

FIG. 2 illustrates a path from an e-mail server 202 to the mobile communication device 10. A mobile device server 204 is communicatively connected to the e-mail server 202 for receiving and formatting PIM application data items, such as e-mail messages, e-mail attachments, calendar events, voice mail messages, appointments, and task items for use by the mobile communication device 10. The mobile device server 204 connects to a Wide Area Network (WAN) 208, such as the Internet, through a proxy server 206. The WAN 208 and the proxy server 206 allow the mobile device server 204 to communicate with an antenna 140 that is in contact with the mobile communication device 10.

The mobile device server 204 may be loaded with a computer readable instruction for executing methods exemplary of this invention from a software medium 214 which could be a disk, a tape, a chip or a random access memory containing a file downloaded from a remote source.

In a known manner of operation, the mobile device server 204 receives documents from the e-mail server 202 in a binary format. The documents may be distilled by the mobile device server 204 and the content information, original visual representation information and navigation information may be extracted by the mobile device server 204. This information may then be organized, stored and linked together, by the mobile device server 204, in an efficient Document Object Model (DOM) in a binary Extensible Markup Language (XML) format.

The mobile device server 204 may then format documents for the mobile communication device 10 and then convert the documents to an efficient format for wireless delivery. Once in the efficient format, the documents are sent, by the mobile device server 204, to the proxy server 206, from which the documents are sent, over the WAN 208, to the antenna 140 that is in contact with the mobile communication device 10.

When a user of the mobile communication device 10 indicates an interest in an attachment to an e-mail displayed on the mobile communication device 10, a request for the attachment is sent, via the antenna 140 and the WAN 208, to the mobile device server 204. Responsive to receiving the request, the mobile device server 204 accesses the DOM and reconstructs the components of the original document that are required to satisfy the request. Based on the request for content (specifying, for example, page and paragraph information or search words) and available information about the mobile communication device (for example, screen size, display type), the mobile device server 204 generates an appropriate document portion from the reconstructed components and sends the appropriate document portion to the mobile communication device 10.

In a manner of operation proposed herein, the mobile communication device 10 presents an additional option responsive to the selection, by the user, of an attachment to an e-mail, where the attachment is a spreadsheet. The additional option allows the user of the mobile communication device 10 to request a description of the spreadsheet. Such a description may relate to a plurality of map cells, where each map cell corresponds to a cell block including at least two cells of said spreadsheet and where the description includes location information and primary data type information for each map cell. The description may be called a "cell map". Responsive to receiving the request for the description at the mobile device server 204, the spreadsheet is processed to generate the cell map, which is subsequently transmitted to the mobile communication device 10. A viewer application at the mobile communication device 10 provides the user with a summary (pictorial) representation of the spreadsheet generated from the cell map and a navigation interface that may be used to select a region of interest within the pictorial representation of the spreadsheet. Responsive to the receipt of an indication of the selection of the region of interest from the mobile communication device 10, the mobile device server 204 transmits a description of the region of interest to the mobile communication device 10. At the mobile communication device 10, a further viewer application (the typical viewer application) may then be invoked to interpret the description of the region of interest and display the region of interest.

In operation, when the mobile device server 204 transmits an e-mail message having an attachment to the mobile communication device 10, a menu of options is associated with the attachment. If the attachment is a word processing document, the options in the menu may include, as presented hereinbefore, an option to receive a table of contents for the word processing document and an option to receive the full content of word processing document. If the attachment is a spreadsheet however, the options in the menu may include, according to aspects of the present invention, an option to receive a cell map of the spreadsheet and an option to receive the full content of the spreadsheet.

When the user selects a spreadsheet included as an attachment to an e-mail message, the user interface of the mobile communication device 10 presents the menu of options received from the mobile device server 204. If the user selects the option to receive a cell map of the spreadsheet, the mobile communication device 10 transmits a request to the mobile device server 204 for the cell map.

Responsive to receiving the request for the cell map, the mobile device server 204 processes the spreadsheet to generate the cell map. Steps in an exemplary method of such processing are presented in FIGS. 3 and 4.

Figure 3:
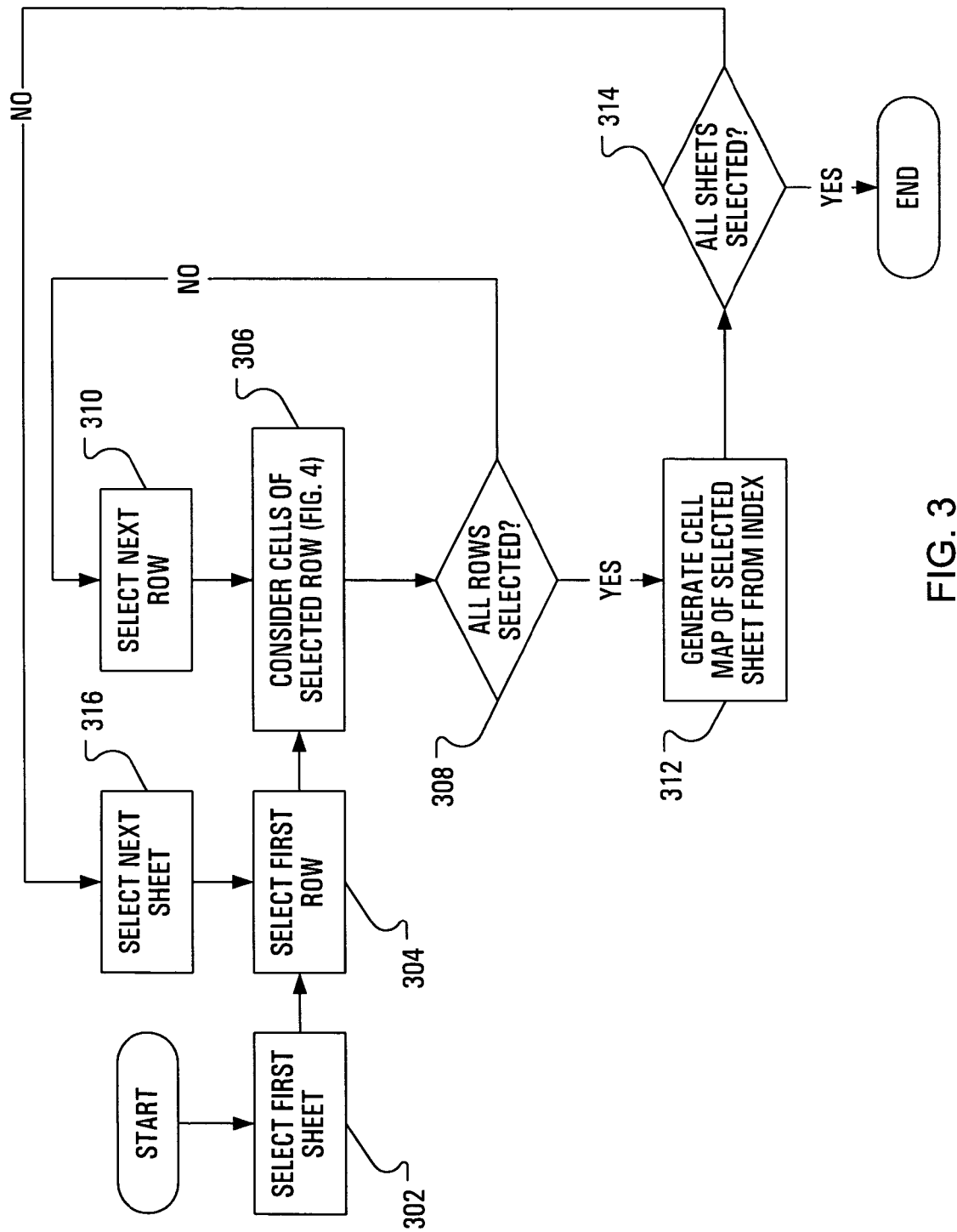
FIG. 3 illustrates steps in an exemplary method of processing a spreadsheet according to an embodiment of the present invention.

According to an exemplary method of processing a spreadsheet, steps of which are illustrated in FIG. 3, initially, the first sheet (if there are multiple sheets) is selected (step 302). The first row of the selected sheet is then selected (step 304) and each cell in the selected row is considered (step 306) in a manner expanded upon in FIG. 4. The consideration of each cell in the selected row results in entries in an index for the selected sheet, as will be discussed in detail hereinafter.

When the consideration of the cells in the row is complete, it is determined whether all rows have been selected (step 308). If all rows have not been selected, the next sequential row is selected (step 310) and each cell in the newly selected row is considered (step 306). If all rows have been selected, the index for the selected sheet is processed, in manner that will be discussed in detail hereinafter, to generate the cell map of the selected sheet (step 312). It is then determined whether all sheets have been selected (step 314). If all sheets have not been selected, the next sequential sheet is selected (step 316) and the first row in the newly selected sheet is selected (step 304). If all sheets have been selected, the processing of the spreadsheet is considered complete.

Figure 4:
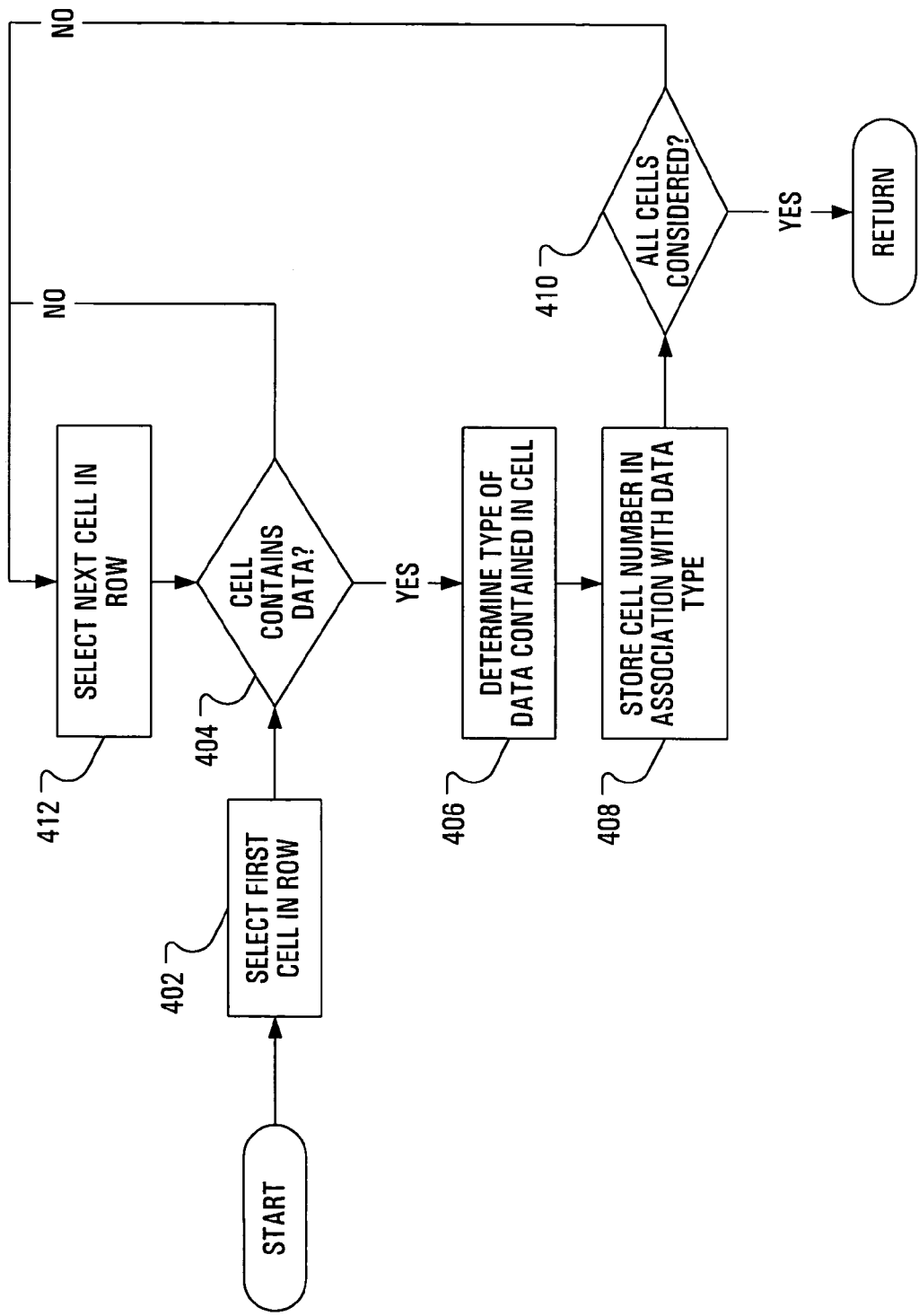
FIG. 4 illustrates steps in an exemplary method of processing a row of cells in the spreadsheet processed in the method of FIG. 3, according to an embodiment of the present invention.

According to the exemplary method of FIG. 4, the consideration of a selected row begins with the selection of the first cell in the row (step 402). It is then determined whether the selected cell contains data (step 404). If it is determined that the selected cell contains data, the type of the data contained in the selected cell is determined (step 406). Spreadsheet cells are known to contain many types of data including, for example, values, text and formulae.

Determining the type of the data contained in the selected cell (step 406) may rely on logic similar to the following:
if the cell begins with "=", the type of the data contained in the selected cell may be considered to be "formula";
if the cell begins with "'", the type of the data contained in the selected cell may be considered to be "text"; and
if the cell contains strictly numeric data, the type of the data contained in the selected cell may be considered to be "value".

Such rules for determining the type of the data contained in the selected cell may be called a typemask.

Subsequent to the data type determination of the selected cell, the cell reference (e.g., A1) is stored (step 408), in an index for the selected sheet, in association with an indication of the type of data contained in the cell. It is then determined whether all the cells of the row have been considered (step 410). In the event that cells are yet to be considered, the next cell in the selected row, i.e., the cell in the adjacent column, to the right hand side of the most recently selected cell, is selected for consideration (step 412). The selection of the next cell (step 412) is also performed when it is determined (step 404) that the selected cell does not contain any data. In the event that all cells in the row have been considered, the consideration of the selected row (step 306, FIG. 3) is considered complete. For example, the cell references for the first row may follow the sequence A1, A2, . . . , those of the second row of the first sheet may follow the sequence B1, B2, . . . , and so on with the cell reference for the first row of the second sheet following that of the last row of the first sheet.

Once each sheet of a spreadsheet has been processed to give a sheet-specific index, the indices are processed (step 312, FIG. 3). The processing of a particular index under consideration begins with a determination of the size of the sheet to which the index corresponds. As the index under consideration only contains entries for cells which contain data, the index can be used to determine the size of the sheet, where the size of the sheet is considered to include sheet width, defined by the cell reference of the right-most cell containing data, and sheet length, defined by the cell reference of the bottom-most cell containing data.

The cell references, which each have an alphabetic component and a numeric component, are evaluated. The alphabetic component and numeric component of each reference is separated. Two lists are then formed; one list of the alphabetic components and one list of the numeric components. The two lists are then sorted. The alphabetic component (which may be a single letter or a series of letters) which is last, alphabetically, indicates the right-most column. The highest numeric value indicates the bottom-most row. For example, if cell reference A40 has the highest numeric value in the index and cell reference YY1 is last, alphabetically, the sheet would be considered to be defined at least from cell A1 through cell YY40 (the sheet is always assumed to "begin" at cell A1, even if there is no data in that cell). Such a sheet would be considered to have a length of 40 cells and a width of 51 cells.

As discussed briefly hereinbefore, the mobile device server 204 generates and transmits portions of content of attachments based on available information about the mobile communication device 10 including screen size and display type. It may be that the screen size and display type are suitable for displaying a 20 cell by 20 cell portion of a spreadsheet. As such, a target size for the cell map may be 20 cells wide and 20 cells long. In such a case, if the discovered length or width of the spreadsheet exceeds 20 cells, logic must be applied to generate a cell map that will lead to the generation of a pictorial representation that will fit on the display of the mobile communication device 10.

For sheets with a width of less than 21 cells and a length of less than 21 cells, a pictorial representation of the sheet may not be considered advantageous. If either length or width exceeds 20 cells, a number of cells to be aggregated into a single cell of the cell map is determined by first determining a Maplength parameter and a Mapwidth parameter. The Maplength parameter may be determined by dividing the length of the sheet to be displayed by the length of the display (in cells, 20 in our exemplary case). The Mapwidth parameter may be determined by dividing the width of the sheet to be displayed by the width of the display (in cells, 20 in our exemplary case). The result of the division is then rounded up to the nearest whole number.

For example, if the sheet under consideration is 40 cells wide and 60 cells long, then the Maplength is three and the Mapwidth is two. Consequently, every cell in the pictorial representation may be arranged to represent the data contained in a three cells long by two cells wide area of cells on the sheet under consideration. In other words, the rectangle formed by cells A1 through B3 would be represented in the pictorial representation by a single cell, as would cells A4 through B6 and C1 through D3. Each of these rectangles may be called a "cell block".

Cell blocks are then considered starting in the top left (e.g., the cell block containing cell A1) and considering, in order, the cell blocks to the right of the top left cell block. Subsequently, the cell blocks in the next row of cell blocks down from the top left cell block may be considered. In considering a cell block, the type of the cells within the cell block is determined (text, formula, value). The cell type that is most prevalent is deemed to be the "primary" cell type for the cell block. For example, if five of the eight cells in a cell block had the data type "value", then "value" would be the primary data type. If there are two or more types with the same number of cells in the cell block, the primary cell type for the cell block may be "mixed". For each cell block, the contents of the top-leftmost cell that is not empty may be considered to be the "data label" for the cell block. For example, in a cell block with the primary cell type "value", the contents of the top-leftmost cell that is not empty may be "EMPLOYEE". In which case, "EMPLOYEE" would be the data label for the cell block. Once determined, the data label and the primary cell type information for each cell block may be stored, along with location information, in the cell map as relating to the corresponding map cell.

To maintain the association between a map cell and a cell block, the map cell may also be associated with an identity.

When this process of associating a data label and primary cell type information with each map cell is completed, the resulting cell map may describe each map cell in terms of a primary type, a location and a data label. The location of a map cell may be expressed as a cell reference for the top-leftmost cell of the corresponding cell block.

The completed cell map, which may include location information, primary data type information and a data label data for each of the map cells in the 20 map cell by 20 map cell cell map, may then be transmitted by the mobile device server 204 to the mobile communication device 10.

Figure 5:
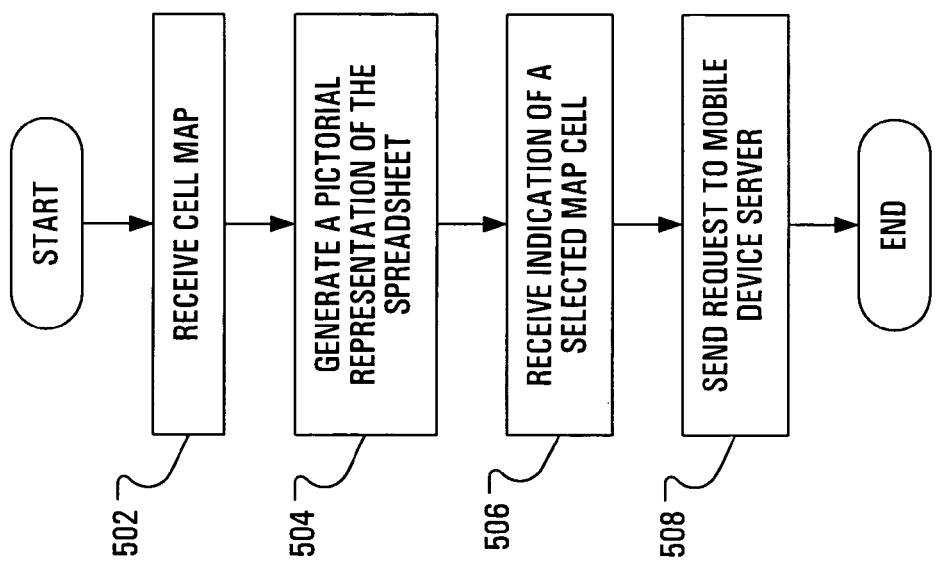
FIG. 5 illustrates steps in a method of presenting a pictorial representation to a user at the mobile communication device of FIG. 1.
Figure 6:
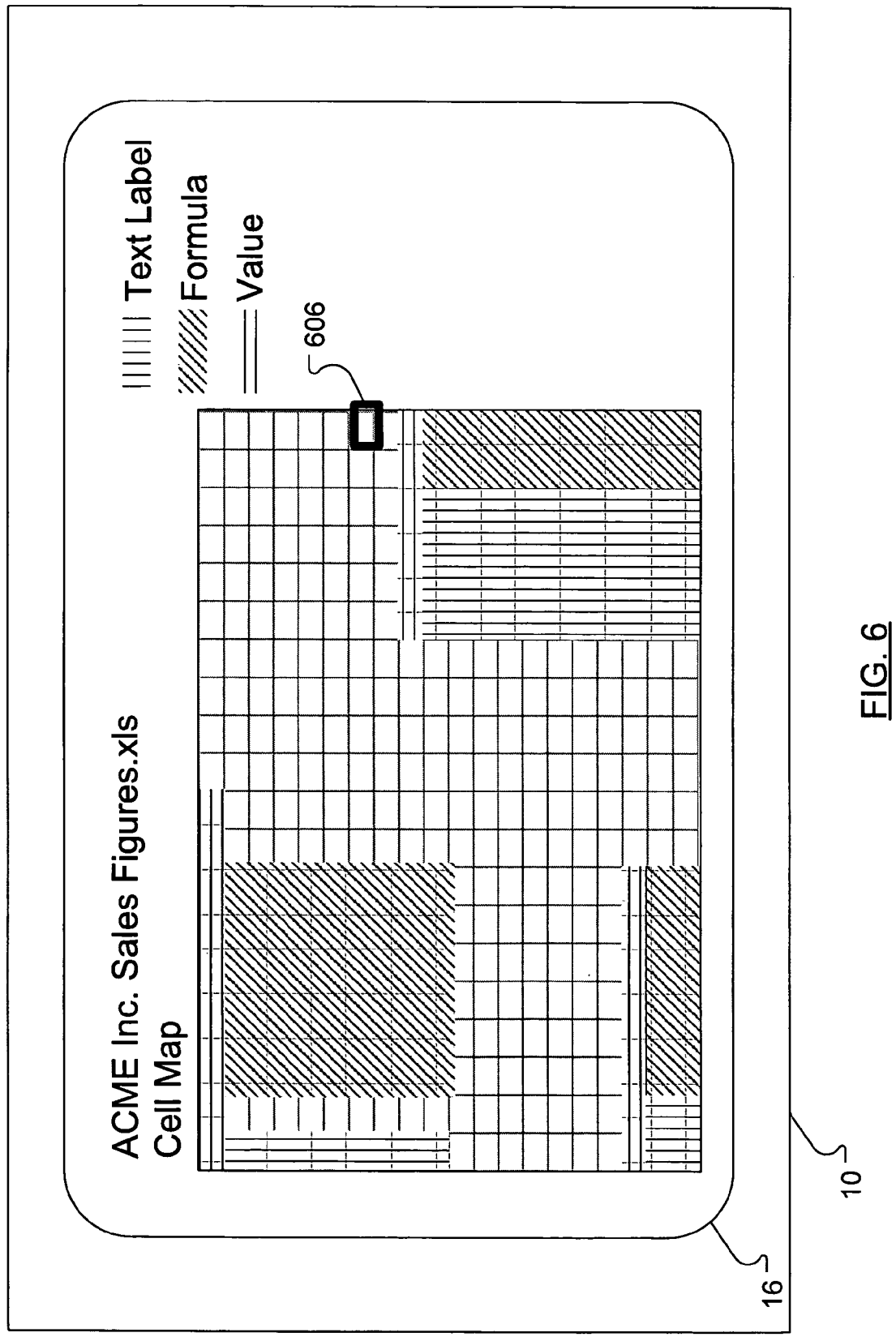
FIG. 6 illustrates a mobile communication device having a display displaying pictorial representation of a spreadsheet according to an embodiment of the present invention.

FIG. 5 illustrates steps in a method of presenting the pictorial representation to the user at the mobile communication device 10. When the mobile communication device 10 receives the cell map (step 502), the mobile communication device 10 uses the cell map to generate a pictorial representation of the spreadsheet (step 504). FIG. 6 presents a simplified illustration of the mobile communication device 10 having the display 16. The display 16 of the mobile communication device 10 in FIG. 6 is illustrated to be displaying pictorial representation of a spreadsheet. In particular, map cells in the pictorial representation that correspond to cell blocks that contain data are illustrated with a fill pattern. The fill patterns used in FIG. 6 include vertical lines for map cells corresponding to cell blocks for which text labels are prevalent, diagonal lines for map cells corresponding to cell blocks for which formulae are prevalent and horizontal lines for map cells corresponding to cell blocks for which values are prevalent. As will be understood by those skilled in the art, while fill patterns are suitable distinguishing markings for a pictorial representation on a monochrome display, fill colors may be used as distinguishing markings for a pictorial representation on a color display. Further alternatively, a character or characters may be used to identify the primary data type of each map cell, for example, "T" for Text Labels, "V" for Values and "F" for Formulae.

The mobile communication device 10 may provide a navigation interface that may be used to select a region of the document to be viewed. In particular, the navigation interface may take the form of a frame 606 that may appear to overlay a single map cell of the pictorial representation. The user may employ an input interface (e.g., arrow keys, touch screen, joystick, thumbwheel, etc.) to position the frame 606 over a map cell in region of interest. As the user positions the frame 606 around the pictorial representation, the frame 606 may pass over a filled map cell, indicative of a correspondence to a cell block that includes data. When the frame 606 is positioned over a filled map cell, the data label for the corresponding cell block may be displayed, as a navigational aid for the user, who may, as a result, gain an idea of the data that is contained in the corresponding cell block. The data label may appear in a status bar (not shown) or appear in a text box (not shown) overlaying the pictorial representation. For example, when the frame 606 is positioned over a filled map cell at the top left edge of a "values" section, the text "451.1" may be displayed, if that were the data label for the corresponding cell block.

After appropriately positioning the frame 606, the user may select a map cell, thereby specifying a region of interest. Responsive to the receipt of an indication of the selection of a map cell (step 506), the mobile communication device 10 may transmit to the mobile device server 204 a request including an indication of the region of interest (step 508). In particular, the indication may be the identity of the selected map cell.

Where the cell block corresponding to the selected map cell is smaller than the exemplary 20 cell by 20 cell display area, the region of interest may be defined to fit the display area of the mobile communication device 10 and be defined to include the cell block corresponding to the selected map cell as the top-leftmost cell block. Alternatively, the region of interest may be defined to fit the display area of the mobile communication device 10 and be defined to include the cell block corresponding to the selected map cell as the center cell block.

Where the cell block corresponding to the selected map cell is larger than the exemplary 20 cell by 20 cell display area, the region of interest may be defined to fit the display area of the mobile communication device 10 and be defined to include the top-leftmost cell of the cell block corresponding to the selected map cell as the top-leftmost cell of the displayed region of interest. Alternatively, the region of interest may be defined to fit the display area of the mobile communication device 10 and be defined to include the top-leftmost cell in the cell block corresponding to the selected map cell as the center cell of the displayed region of interest.

Figure 7:
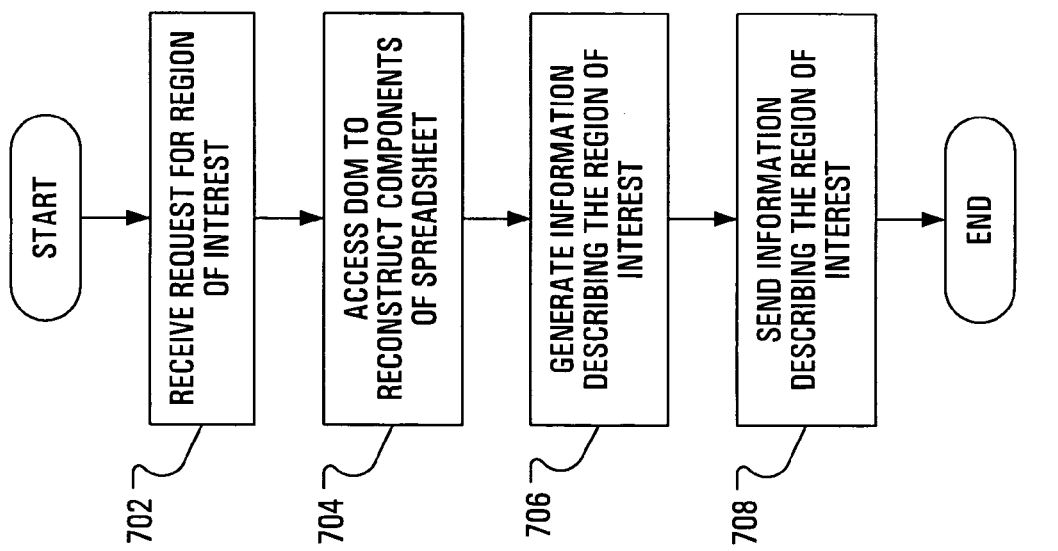
FIG. 7 illustrates steps in a method of processing, at the mobile device server of FIG. 2, a request for a region of interest according to an embodiment of the present invention.

Steps of a method of processing, at the mobile device server 204, a request for a region of interest are presented in FIG. 7. The method is initiated by receiving a request for a region of interest (step 702). Responsive to the receipt of the request for the region of interest, the mobile device server 204 accesses the DOM of the spreadsheet and reconstructs the components of the spreadsheet (step 704) that are required to satisfy the request. Based on the request for the region of interest (identifying, for example, the top-leftmost map cell) and available information about the mobile communication device, the mobile device server 204 generates information describing the region of interest (step 706) from the reconstructed components and sends the information describing the region of interest to the mobile communication device 10 (step 708).

At the mobile communication device 10, upon receipt of the information describing the region of interest, the viewer application for viewing attachments is invoked to interpret the information and display the region of interest, as the region of interest would normally be viewed.

By way of example, consider a user of the mobile communication device 10 who receives a spreadsheet containing only two columns; text labels and values. The very last row contains totals for the columns. A pictorial representation of such a spreadsheet would quickly indicate to the user where to locate the totals. Responsive to the user employing the user interface to move the frame down to the bottom of the pictorial representation, the data label "Total" may be shown and the user may then select one of the map cells in the last row. In response to such a selection by the user, the mobile communication device 10 requests the region at the bottom of the spreadsheet, receives the requested region and initiates the attachment viewer to display the region including the bottom row cells in a view familiar to the user.

Advantageously, according to aspects of the present invention, the user of the mobile communication device 10 may view a high-level pictorial representation of the contents of a spreadsheet, dynamically sized to present the entire spreadsheet. Additionally, the frame 606 (FIG. 6) can be scrolled around the pictorial representation horizontally and vertically. When the frame 606 passes over a filled map cell, some content from the spreadsheet may be displayed. Through user action to select a region of interest in the pictorial representation, a normal view of the region of interest of the spreadsheet may be requested and viewed without undue requesting and viewing of regions of the spreadsheet that are not of immediate interest.

As will be apparent to those skilled in the art, the discussed typemask, type names and graphical representations of the types should be considered exemplary, not strictly the only types that may be defined not the manner in which the types may represented. A customer update table may be defined to contain the criteria by which a data item may be determined to match a given type (typemask), the name of the type to be used in the event that such a match is found, and a graphical representation (i.e., a color) to associate with the given type when representing the data visually.

Other modifications will be apparent to those skilled in the art and, therefore, the invention is defined in the claims.

I claim:

1. A method of displaying a representation of a spreadsheet on a mobile communication device, said method comprising:
   receiving a description of said spreadsheet, where said description relates to a plurality of map cells, where each map cell in said plurality of map cells corresponds to a cell block, each cell block comprising at least two adjacent cells of said spreadsheet arid said description includes location information and primary data type information for said each map cell;
   generating a summary representation of said spreadsheet, based on said location information and said primary data type information wherein each map cell is represented in said summary representation of said spreadsheet by an indicator of its primary data type; and
   displaying said summary representation of said spreadsheet.

2. The method of claim 1 further comprising;
   receiving notice of a selection of a region of interest by a user of said mobile communication device;
   transmitting an indication of said region of interest to a server;
   receiving information describing said region of interest from said sewer; and
   invoking a viewer application to:
      interpret said information describing said region of interest; and
      display said region of interest.

3. The method of claim 2 wherein said receiving notice of said selection of said region of interest by said user comprises receiving an identity of a given map cell.

4. The method of claim 3 wherein said region of interest is defined to include a given cell block as the top-leftmost cell block, where said given cell block corresponds to said given map cell.

5. The method of claim 3 wherein said region of interest is defined to include a given cell block as the center cell block, where said given cell block corresponds to said given map cell.

6. The method of claim 1 wherein said description includes a data label for said each map cell in said plurality of map cells.

7. The method of claim 6 wherein said data label is derived from data contained by a given cell of said at least two adjacent cells in said cell block corresponding to said each map cell, which given cell is the topmost and leftmost cell having data content.

8. The method of claim 3 wherein said displaying said summary representation of said spreadsheet further comprises providing a navigation interface that may be used to select said region of interest.

9. The method of claim 1 further comprising, before said receiving said description of said spreadsheet;
   receiving an indication of an association or said spreadsheet with an e-mail message; and
   displaying a menu including an option to display said summary representation.

10. The method of claim 9 further comprising:
    detecting selection of said option to display said summary representation; and
    transmitting a request for said description of said spreadsheet.

11. The method of claim 1 wherein said indicator is one of a fill pattern, fill colour, or a letter.

12. A mobile communication device comprising a processor adapted to:
    receive a description of a spreadsheet, where said description relates to a plurality of map cells, where each map cell in said plurality of map cells corresponds to a cell block, each cell block comprising at least two adjacent cells of said spreadsheet and said description includes location information and primary data type information for said each map cell;
    generate a summary representation of said spreadsheet, based on said location information and said primary data type information wherein each map cell is represented in said summary representation of said spreadsheet by an indicator of its primary data type; and
    display said summary representation of said spreadsheet.

13. A computer readable medium containing computer-executable instructions that, when performed by a processor in a mobile communication device, cause said processor to:
    receive a description of a spreadsheet, where said description relates to a plurality of map cells, where each map cell in said plurality of map cells corresponds to a cell block, each cell block comprising at least two adjacent cells of said spreadsheet and said description includes location information and primary data type information for said each map cell;

generate a summary representation of said spreadsheet, based on said location information and said primary data type information wherein each map cell is represented in said summary representation of said spreadsheet by an indicator of its primary data type; and display said summary representation of said spreadsheet.

14. A method of preparing a description of a spreadsheet, said method comprising:

analyzing each spreadsheet cell of a plurality of spreadsheet cells of a sheet of a spreadsheet:
to determine whether said each spreadsheet cell contains data; and
if said each spreadsheet cell contains data, to determine a type for said data;

determining, from spreadsheet cells determined to contain data, sheet dimensions, where said sheet dimensions include a sheet length, expressed as a number of spreadsheet cells, and a sheet width, expressed as a number of spreadsheet cells wherein where said sheet width is greater than a first predetermined number of spreadsheet cells, dividing said sheet into a plurality of cell blocks, where each cell block of said plurality of cell blocks has identical cell block dimensions and where said cell block dimensions include a length, expressed as a number of spreadsheet cells, and a width, expressed as a number of spreadsheet cells, and choosing said cell block width as a width which is greater than one spreadsheet cell wide and where said sheet length is greater than a second predetermined number of spreadsheet cells, choosing said cell block length as a length which is greater than one spreadsheet cell long;

assigning a corresponding map cell to said each cell block, thereby creating a plurality of corresponding map cells;

determining primary data type information and location information for each map cell of said plurality of map cells, where said primary data type information for said each corresponding map cell is representative of a prevalent data type of spreadsheet cells in said each cell block; and transmitting, to a mobile communication device, a description of said sheet including said primary data type information and said location information for said each map cell.

15. The method of claim 14 further comprising:
receiving, from said mobile communication device, an indication of a region of interest; and
transmitting information describing said region of interest to said mobile communication device.

16. The method of claim 15 wherein said indication is an identity of a map cell.

17. The method of claim 14 wherein said description of said sheet further includes a data label for said each map cell.

18. The method of claim 17 wherein said data label for a given map cell is derived from data contained by a given spreadsheet cell among said at least two adjacent spreadsheet cells in a given cell block corresponding to said given map cell, which given spreadsheet cell is the topmost and leftmost cell having data content.

19. The method of claim 14 where said determining said sheet dimensions comprises determining said sheet length from a numeric component of a given spreadsheet cell reference, where said given spreadsheet cell reference has a maximum numeric component among said spreadsheet cell references of said spreadsheet cells determined to contain data.

20. The method of claim 14 where said determining said sheet dimensions comprises determining said sheet width from an alphabetic component of a given spreadsheet cell reference, where said given spreadsheet cell reference has a maximum alphabetic component among said spreadsheet cell references of said spreadsheet cells determined to contain data.

21. A mobile device server comprising a processor adapted to:

analyze each cell of a plurality of spreadsheet cells of a sheet of a spreadsheet:
to determine whether said each spreadsheet cell contains data; and
if said each spreadsheet cell contains data, to determine a type for said data;

determine, from spreadsheet cells determined to contain data, sheet dimensions, where said sheet dimensions include a length, expressed as a number of spreadsheet cells, and a width, expressed as a number of spreadsheet cells;

determine cell block dimensions, where said cell block dimensions include a length, expressed as a number of spreadsheet cells, and a width, expressed as a number of spreadsheet cells such that, where said sheet width is greater than a first predetermined number of spreadsheet cells, said cell block width is chosen as a width which is greater than one spreadsheet cell wide, and where said sheet length is greater than a second predetermined number of spreadsheet cells, said cell block length is chosen as a length which is greater than one spreadsheet cell long, divide said sheet into a plurality of cell blocks, where each cell block of said plurality of cell blocks has identical said cell block dimensions;

assign a corresponding map cell to said each cell block, thereby creating a plurality of corresponding map cells, determine primary data type information and location information for each map cell of said plurality of map cells, where said primary data type information for said each corresponding map cell is representative of a prevalent data type of spreadsheet cells in said each cell block; and transmit, to a mobile communication device, a description of said sheet including said primary data type in formation and said location information for said each map cell.

22. A computer readable medium containing computer-executable instructions that, when performed by a processor in a mobile device server, cause said processor to:

analyze each cell of a plurality of spreadsheet cells of a sheet of a spreadsheet:
to determine whether said each spreadsheet cell contains data; and
if said each spreadsheet cell contains data, to determine a type for said data;

determine, from spreadsheet cells determined to contain data, sheet dimensions, where said sheet dimensions include a length, expressed as a number of spreadsheet cells, and a width, expressed as a number of spreadsheet cells;

determine cell block dimensions, where said cell block dimensions include a length, expressed as a number of spreadsheet cells, and a width, expressed as a number of spreadsheet cells such that, where said sheet width is greater than a first predetermined number of spreadsheet cells, said cell block width is chosen as a width which is greater than one spreadsheet cell wide, and where said sheet length is greater than a second predetermined number of spreadsheet cells, said cell block length is chosen as a length which is greater than one spreadsheet cell long;

divide said sheet into a plurality of cell blocks, each cell block of said plurality of cell blocks having said cell block dimensions and assign a corresponding map cell to each cell block, determine primary data type information and location information for each corresponding map cell, where said primary data type information for said each corresponding map cell is representative of a prevalent data type of spreadsheet cell contents among spreadsheet cells in said each cell block; and transmit, to a mobile communication device, a description of said sheet including said primary data type information and said location information for said each map cell.

* * * * *

UNITED STATES PATENT AND TRADEMARK OFFICE
CERTIFICATE OF CORRECTION

PATENT NO. : 7,299,406 B2  Page 1 of 1
APPLICATION NO. : 10/857900
DATED : November 20, 2007
INVENTOR(S) : Jeffrey R. Schnurr It is certified that error appears in the above-identified patent and that said Letters Patent is hereby corrected as shown below:

TITLE PAGE
Item [56] under Other Publications, line 3, replace "knowledgeoontorpublic/livolink.exe" with -- knowledgecenterpublic/livelink --

CLAIM 1
Column 11, Line 53, replace "arid" with -- and --

CLAIM 2
Column 11, Line 63, replace ";" with -- : --
Column 12, Line 2, replace "sewer" with -- server --

CLAIM 9
Column 12, Line 31, replace ";" with -- : --

CLAIM 21
Column 14, Line 31, replace "," with -- ; --
Column 14, Line 37, replace "," with -- ; --

Signed and Sealed this

First Day of April, 2008

JON W. DUDAS
*Director of the United States Patent and Trademark Office*